United States Patent [19]

Poll

[11] Patent Number: 5,772,217
[45] Date of Patent: *Jun. 30, 1998

[54] LIQUID PUMP SEAL

[75] Inventor: Gerhard W. Poll, Elgin, Ill.

[73] Assignee: SKF USA Inc., Elgin, Ill.

[ * ] Notice: The term of this patent shall not extend beyond the expiration date of Pat. No. 5,605,338.

[21] Appl. No.: 806,837

[22] Filed: Feb. 24, 1997

Related U.S. Application Data

[62] Division of Ser. No. 524,481, Sep. 7, 1995, Pat. No. 5,605,338.

[51] Int. Cl.$^6$ ....................................................... F16J 15/36
[52] U.S. Cl. ............................................ 277/383; 277/391
[58] Field of Search .................................. 277/42, 43, 65, 277/85, 88, 89, 90, 164

[56] References Cited

U.S. PATENT DOCUMENTS

| 2,608,425 | 8/1952 | Krng .......................................... 277/89 |
| 3,199,878 | 8/1965 | Cunningham et al. ..................... 277/88 |
| 3,269,738 | 8/1966 | Baumler et al. ........................... 277/81 |
| 4,165,084 | 8/1979 | Kempf ...................................... 277/164 |
| 4,247,123 | 1/1981 | Potter ........................................ 277/88 |
| 4,319,757 | 3/1982 | Fitzpatrick-Ellis ...................... 277/81 R |
| 4,428,588 | 1/1984 | Oelke ........................................ 277/83 |
| 4,703,939 | 11/1987 | Wentworth ............................... 277/88 |
| 4,789,166 | 12/1988 | Rericha et al. .......................... 277/134 |
| 5,192,085 | 3/1993 | McOnie ..................................... 277/81 |

FOREIGN PATENT DOCUMENTS

| 1074342 | 1/1960 | Germany . |
| 0159000 | 5/1957 | Sweden . |
| 0727135 | 3/1955 | United Kingdom . |
| 1237881 | 6/1971 | United Kingdom ................... 277/164 |

Primary Examiner—Randolph A. Reese
Assistant Examiner—John L. Beres
Attorney, Agent, or Firm—James T. Fitzgibbon

[57] ABSTRACT

A liquid seal unit having a seal ring with an annular end face cooperating with a seal mating ring on an associated component to form a liquid-tight dynamic seal. A composite multi-functional member with a flexible finger spring embedded in a unitary elastomeric body urges the seal ring and the mating ring together. The spring has an annular continuous outer body portion and a plurality of circumferentially spaced apart, radially inwardly extending flexible spring fingers. The unitary elastomeric body includes radially spaced, first and second annular load bearing formations that extend in axially opposite directions. The elastomeric body still further includes an axially extending sealing ring positioning collar lying radially between the load bearing formations and having an inner surface that engages a seating surface in the seal ring to provide a secondary seal. The seal ring positioning collar responds to an axially outward deflection of the spring fingers by deflecting radially inwardly to increase the radial load exerted on the seal ring seating surface.

9 Claims, 2 Drawing Sheets

LIQUID PUMP SEAL

This application is a divisional of application Ser. No. 08/524,481, filed on Sep. 7, 1995 now U.S. Pat. No. 5,605,338.

BACKGROUND OF THE INVENTION

The present invention relates generally to seals for liquid pumps and more particularly, to a particular construction and arrangement of elements forming a seal that is primarily adapted for use in fluid pumps such as the so-called water pumps of prime mover engines, including but not limited to engines for automobiles, trucks and construction machinery.

While a wide variety of seals have been developed and/or proposed for use as so-called water pump or fluid pump seals, in most cases the most effective types of seal, considering the need for reliability, economy, and long life, have been so-called mechanical end face seals. In these seals, the so-called primary seal or the seal wherein two components rotate or otherwise move relative to each other is formed where what is termed a seal ring meets what is termed a mating ring, each ring presenting a substantially flat, annular end face in opposition to a counterpart end face on the other element. The portion of these faces, where actual sliding contact is made, is called the seal band. The two units are urged into sealing contact by a resilient means of some sort.

Customarily, the part of the mechanism external to the outer diameter or o.d. portions of the sealing and the mating rings is occupied by the fluid to be sealed. This fluid is normally water or a water/glycol mix in the case of automotive type engines, and water or watery waste in the instance of so-called appliance seals used on washing machines and the like. In addition, the chemical process industry requires similar seals that are the same in principle as the seals just discussed, but sometimes pose the additional requirement of chemical resistance in view of the fluids being handled.

One important requirement for an end face seal is that of providing some relatively constant axial force that, regardless of a variation in the position of the rings, will still urge the sealing rings into mating engagement under operating conditions. If the axial force varies significantly with axial change of ring position, then, where the parts are new or the installed height is relatively low in relation to the specified value, the end face load will be excessive, causing undue temperature rise and rapid wear. If the force drops off abruptly with a change in installed height, the initial loading would be too low if the actual installed height is high; in other words, if the parts are not initially fit tightly enough, they would suffer from an insufficient load and be prone to leakage. If the load varied considerably under conditions of dynamic runout, the proper consistent balance between loads sufficient to maintain the seal and still low enough not to cause wear, could be compromised. Hence, a relatively constant force or that is, a minimal variation in spring force with relative to deflection is preferred. In this manner, a sufficiently high initial force can be applied and that force can be maintained throughout significant dimensional variations without unduly increasing or decreasing the force.

Inasmuch as one component of an end face seal (usually the so-called mating ring), is affixed to a rotary part and the other element, commonly the sealing ring, is fixed relative to a housing or the like, there must be a way of transmitting torque or rotary resistance from the housing to the seal ring. Were the seal ring and the mating ring to turn together, there would be relative motion in an undesired location, causing leakage and failure of the system.

Still further, mechanical end face seals require a secondary or static seal, i.e., a means of ensuring that there is no fluid leakage between components other than those which rotate relative to each other, and this seal must remain effective even if the parts vibrate or move on account of wear or the like.

Another requirement is that the seal ring must be positioned relative to both rotary parts and fixed parts in such a way that the locus of the seal band remains relatively constant.

In the past, the most popular forms of mechanical end face seal have been those wherein a different component is provided for each different function. Normally, a coil spring or the like arranged coaxially with the impeller shaft supplies the axial force, various splines or the like permit axial movement of the parts and provide the ability to transmit torque, and a rubber diaphragm or the like provides the secondary or static seal, and a guide, a bushing or the like centers the seal ring relative to the mating ring.

Besides coaxially arranged coil springs, resilient forces can be provided by other forms of springs. One form of seal, wherein numerous functions are provided in a single part, was described and claimed in U.S. Pat. No. 3,241,843, and in various other patents describing improvements to and variations of such seal. In some instances, a finger type spring has been used or suggested to apply the radial load of the axial load. These applications include those shown in U.S. Pat. No. 2,608,425. Other patents have suggested encasing a metal Belleville washer or the like within rubber. However, in those designs, particularly wherein the rubber/metal member was positioned in a seat formed where radial and axial surfaces met, proper force application could not be reliably insured.

As with all highly engineered products, therefore there has continued to be a need for improved seals, particularly those which may be produced at relatively low costs and which provide superior performance in use. Some of the difficulties which have been created with prior art seals have to do with the manner in which the end face load is applied to the seal. Other difficulties have arisen, particularly wherein the surfaces of rubber parts exposed to the fluid to be sealed are placed in tension either constantly or periodically, initially inducing surface cracking which can ultimately lead to failure of the entire rubber part.

Some seal constructions have had difficulty in the area of precise radial location of the seal ring, especially where significant dynamic eccentricity is present or wherein the members called upon to provide radial location of the ring have been relatively flexible instead of relatively stiff.

Certain other difficulties have arisen with end face seals, particularly fluid pump seals, wherein because of variation in so-called installed heights, there has been an unduly high variation in axial load throughout the life of the seal.

Because of gradual improvements made to engines of various kinds, their service lives have been extended considerably in relation to the service lives of engines produced long ago or even more recently. Thus, while an automotive engine warranty of 12,000 miles was standard in the industry for many years, warranties of 50,000, 60,000 or even 100,000 miles and more are not uncommon, even for less expensive auto engines. Larger, heavier duty engines, such as diesel engines used in over-the-road trucks, have even longer anticipated service lives (such as 500,000 to 1,000,000 miles for example), and accordingly, the water pump seals in such engines should be of a design that would be reasonably expected to provide effective sealing over a period of many years and many thousand hours of actual operation.

An ideal seal is one wherein the applied load varies little or not at all throughout a wide range of installed heights, both those arising from variations in the installed dimensions, thermal expansion, and component wear. By "installed heights" is meant the axial distance between the plane of the end face of the seal ring and a given reference plane, usually the end face surface of a seal-receiving counterbore.

In view of the failure of the prior art to provide an end face seal with improved capabilities for a large variety of applications, it is an object of the present invention to provide an improved end face seal.

Another object of the invention is to provide an end face seal wherein a number of functions required of the seal are provided by a single composite element having two components providing these functions.

Yet another object of the invention is to provide a low-cost seal that will be reliable, and operate for an extended period.

A further object of the invention is to provide an end face seal wherein pressure in the area of the fluid to be sealed augments the sealing action and insures that the elastomeric parts exposed to the seal fluid are not unduly deformed by being subject to tensile stresses.

A still further object of the invention is to provide a seal wherein a novel construction of composite element is provided to insure proper radial location of the seal ring.

An additional object of the invention is to provide a seal wherein a composite element provides the multiple functions of secondary sealing, appropriate establishment and maintenance of axial load and transmission of torque.

Another object of the invention is to provide a liquid pump seal wherein a multi-function composite unit includes a finger or disc type spring element embedded in an elastomeric component that includes a collar adapted to snugly surround a portion of the sealing ring so as to transmit torque or rotary force thereto, to provide a tight secondary seal and to insure proper radial location or alignment of the ring.

Yet another object of the invention is to provide an arrangement of a composite multi-function unit wherein relative motion between this unit and the associated parts will not compromise the effectiveness of the seal or the longevity of the components.

A further object of the invention is to provide a liquid seal which may be readily assembled with a high degree of reliability within a housing, preferably a housing containing a spring retainer element.

A still further object of the invention is to provide a seal having a low-cost composite element that includes a finger or disc spring and two, and in some cases three, annular beads in particularly desired locations, with one of the beads providing several advantages in applying load to the seal ring which may be manufactured reliably at low cost.

An additional objection is to provide a fluid seal wherein a multi-purpose, multi-function composite unit that includes an axially extending collar for engaging and locating a seal ring is also readily adapted for cooperation with a garter spring or other auxiliary radial load-imparting element.

Yet another object is to provide a composite, multi-function unit which, as molded, includes at least two annular formations adapted respectively to apply sealing force to an end of the seal ring and a portion of the housing, which formations will accommodate variations in the radial size of the finger spring as it moves through a range of axial positions.

The foregoing and other objects and advantages of the invention are achieved in practice by providing a novel liquid seal that includes an annular sealing ring having an end face cooperating with a counterpart face on a mating ring to provide an annular, liquid-tight seal band and a multi-function composite member that includes a metal spring unit embedded therein, with the spring having non-linear load/deflection characteristics so that a relatively constant axial load can be applied through a wide range of seal ring movement, at least two molded annular load bearing formations adapted to apply a spring load force to the seal ring from a portion of the housing, and a collar disposed radially intermediate these formations for snugly receiving and radially locating the sealing ring unit.

The manner in which the foregoing and other objects and advantages are achieved in practice will become more clearly apparent when reference is made to the following detailed description of the preferred embodiments of the invention set forth by way of example and shown in the accompanying drawings wherein like reference numbers indicate corresponding parts throughout.

DESCRIPTION OF THE PREFERRED EMBODIMENTS OF THE INVENTION

While the seal of the invention may be used in association with a variety of mechanical parts, and while components of the seal itself may take on different or modified forms, a description of a preferred form of seal will be given wherein the application is that of an automotive engine water pump wherein the pump impeller is supported on ball bearings, wherein the force application member is a dished finger spring, and wherein the contoured, multi-purpose unit is a molded rubber element encapsulating most or all of the finger spring and providing spaced apart annular formations for applying an axial load to the seal ring and the reaction force to the housing or other stationery part in such a way as to obtain favorable load/deflection characteristics.

Figure 1:
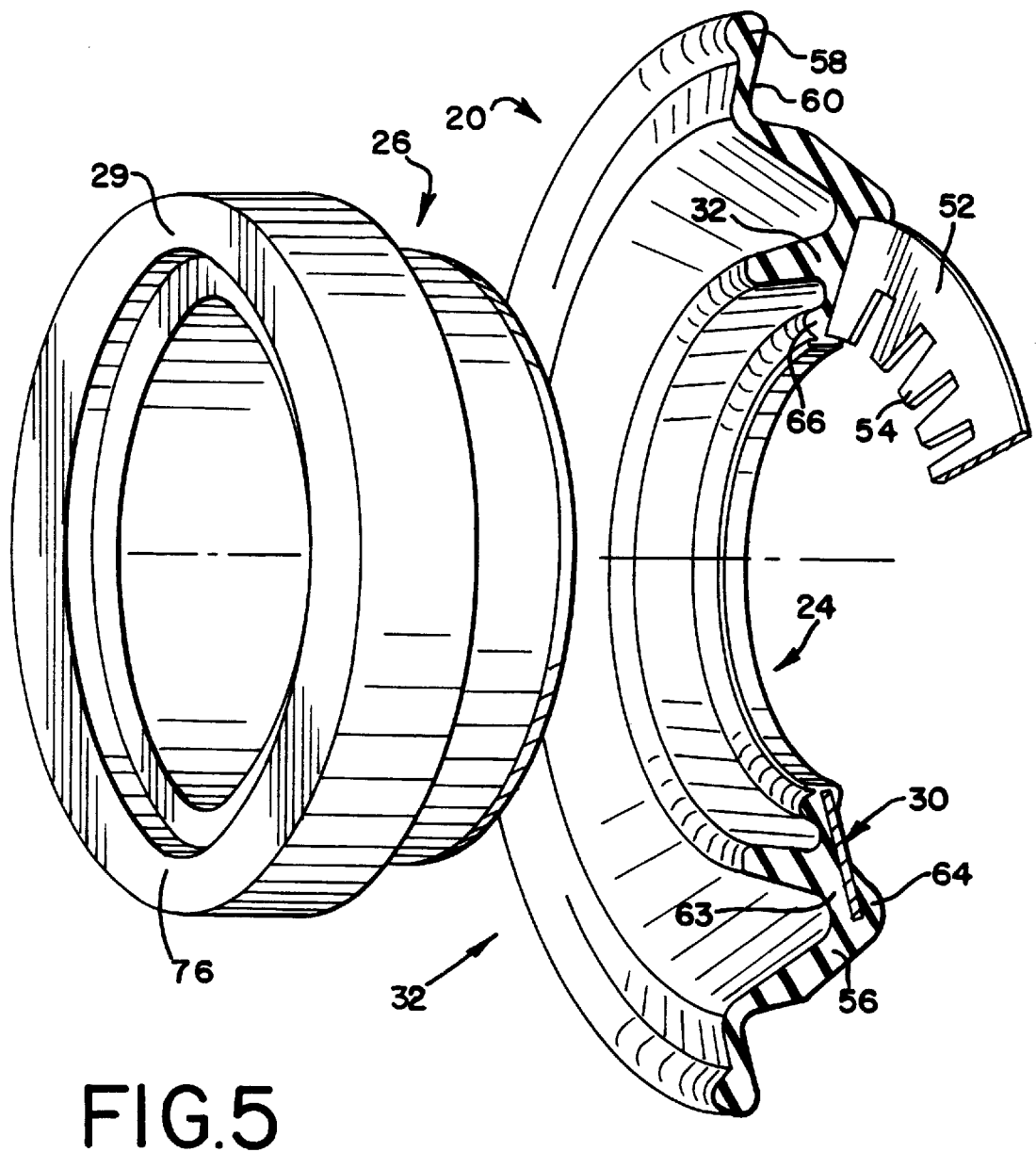
FIG. 1 is an exploded fragmentary perspective view, showing a preferred form of the multi-function composite unit of the invention and a seal ring with which it is intended to be used, prior to assembly of these components.
Figure 2:
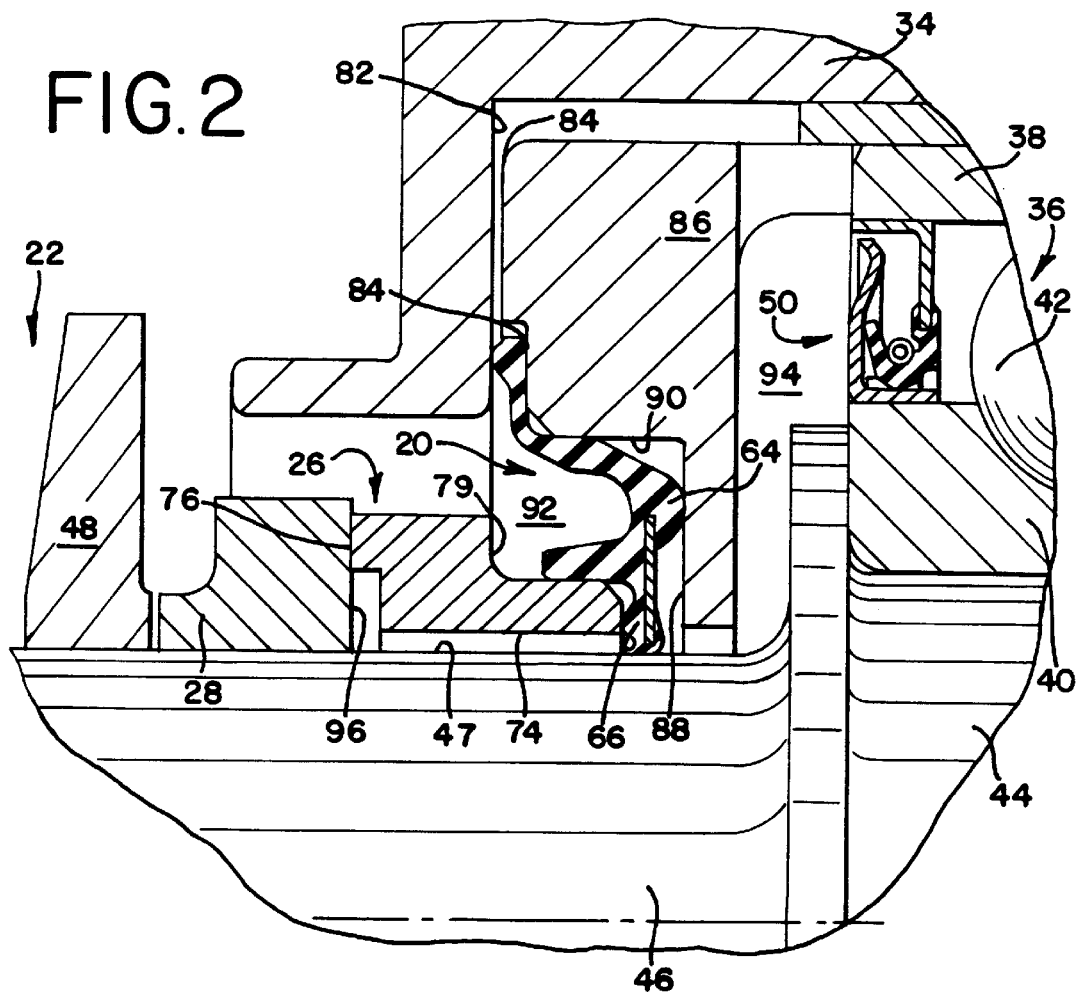
FIG. 2 is a vertical sectional view of portions of the seal unit of the invention, showing the same in an installed position and associated with other components which the inventive seal is usable.

Referring now to the drawings in greater detail, FIG. 1 shows the elements of the seal assembly 20 of the invention and FIG. 2 shows that arrangement generally designated 20 in place within a water pump assembly generally designated 22.

An important part of the invention is the multi-function composite unit generally designated 24, which positions an annular sealing ring generally designated 26 relative to an annular rotary mating ring 28. In use, some, if not all, of the end face surfaces of these rings 26, 28 will form an annular seal band 29 (FIG. 1) wherein relative motion may take place without permitting the sealed liquid (such as a water/glycol solution) to leak from the sealed region.

Referring again to the drawings, it is shown that the composite unit 24 includes two principal components, a normally dished, annular finger spring unit generally designated 30 and an elastomer component generally designated 32 in which the finger spring unit 30 is fully or largely encapsulated. While the pump elements are generally of conventional construction, ease of understanding the invention will be facilitated by describing certain of its components as they are illustrated. In FIG. 2, a stationery pump housing 34, a bearing assembly generally designated 36, including an outer race 38, an inner race 40, and a plurality of rolling elements 42, in the present case these being in the form of ball bearings.

The bearing assembly 36 journals a rotary shaft 44 having a reduced diameter portion 46 on which the mating ring 28 is mounted for rotation. The mating ring 28 is normally shrunk-fit or otherwise snugly received over the outside diameter surface 47 of the reduced diameter shaft portion 46.

As is customary, an impeller 48 is likewise keyed or press fit over the end portion of the rotary shaft 44 so that these elements rotate together. FIG. 2 shows an auxiliary seal generally designated 50 that is used to confine lubricant to the interior of the bearing assembly 36 and exclude moisture from the bearings.

Referring now to the finger spring 30 which is normally substantially or completely encased or encapsulated in the rubber comprising the elastomer component 32 of the composite unit 24, this finger spring unit 30 includes a unitary, annular body 52 and a plurality of radially, inwardly extending fingers 54, each having a length of approximately one-half or somewhat more than one-half of the overall radial dimension of the finger spring body 52.

As the finger spring is formed, customarily from steel, it is of a dished or frustro-conical shape in its relaxed condition, and as will appear, it assumes a substantially flat position as axial load is applied to it during and after initial installation. The size and shape of the finger spring and its installed position are chosen so that the spring operates in the "flat" position of the characteristic load/deflection curve. For example, the load would desirably vary less than 10%–20% during a working movement range of up to 0.060".

Referring now to the elastomeric component generally designated 32, this component includes a body portion 56 having a radially, outermost annular secondary sealing bead 58, an elastomeric radial flange 60, and a generally axially and partly radially extending outer collar section 62 that serves to offset the flange 60 from an inner flange element 63 in which the finger spring unit 30 is embedded. Referring again to the body 56 of the elastomeric component 32, this unit is shown to include a radially and axially outer, load bearing formation 64 in the form of an annular bead. In this connection, and as used herein, the expression "axially inner" means towards the fluid or sealed region and "axially outer" means away from or in a direction opposite that of the sealed region; hence, in FIGS. 1 and 2, axially outer means towards the right.

The body 56 of the elastomeric component 32 also includes a radially inner load bearing formation 66 in the form of an axially and radially inner annular bead. The flange element 63 connects the two beads, 64, 66, the contact surfaces 65, 67 of which are formed facing opposite directions.

Another element of the invention is a radial locating and torque-transmitting inner collar generally designated 70 which forms an integral part of the body 56 and extends axially inwardly from a generally central portion of the finger spring 30. This collar 70 has a larger inside diameter than that of the radially inner load bearing formation 66, for reasons that will appear.

Referring now to other components of the invention, the sealing ring 26 includes a seal ring body 72 having a generally cylindrical inner diameter surface 74 that is separated by a significant working clearance from the outer surface 47 of the reduced diameter portion 46 of the shaft 44. A radially outer, axially inner end face 76 is formed on the body 72, and as is well known in the seal industry, this face 76 is formed so as to have a flat or other desired end face surface adapted to create and maintain a snug seal with the mating ring.

Referring again to the seal ring 26, this unit also includes an outer sealing surface 78 which is shown as cylindrical, an outer shoulder surface 79, and an axially outer end face shoulder surface 80 that cooperates with the formation 66 and receives the axial spring load therefrom.

Referring now to the seal when it is installed, this unit is positioned with the outer bead 58 snugly retained or pinched between a face 82 of the housing 34 and an end face 84 of a groove in the seal retainer 86. The retainer 86 also includes an offset annular end wall 88 and a counterbore surface 90. The snug action just referred to creates a secondary seal to exclude water and the like in the outer space 92 from entering the sealed region 94.

As best shown in FIG. 2, the outer collar 62 has portions lying in contact with the counterbore surface 90 and other surface portions spaced just slightly apart from this counterbore. These contacts also create static seals. The radially outer load bearing formation 64 engages the end wall 88 of the seal retainer. With the impeller 48 and mating ring 28 being located in a predetermined position on the reduced diameter portion 46 of the shaft 44, the end face 96 of the mating ring 28 has engaged the end face 76 (FIG. 1) of the seal ring generally designated 26 and pushed it to the right as shown in FIG. 2. The effect of this is also to create engagement between the end face surface 80 on the axially outer portion of the body 72 of the seal ring 26, to deflect the inner collar 70 somewhat radially inwardly and thus create a snug seal between the somewhat cylindrical inner surface 98 of the collar 70 and the annular seating surface 78 of the seal ring 26.

Figure 3:
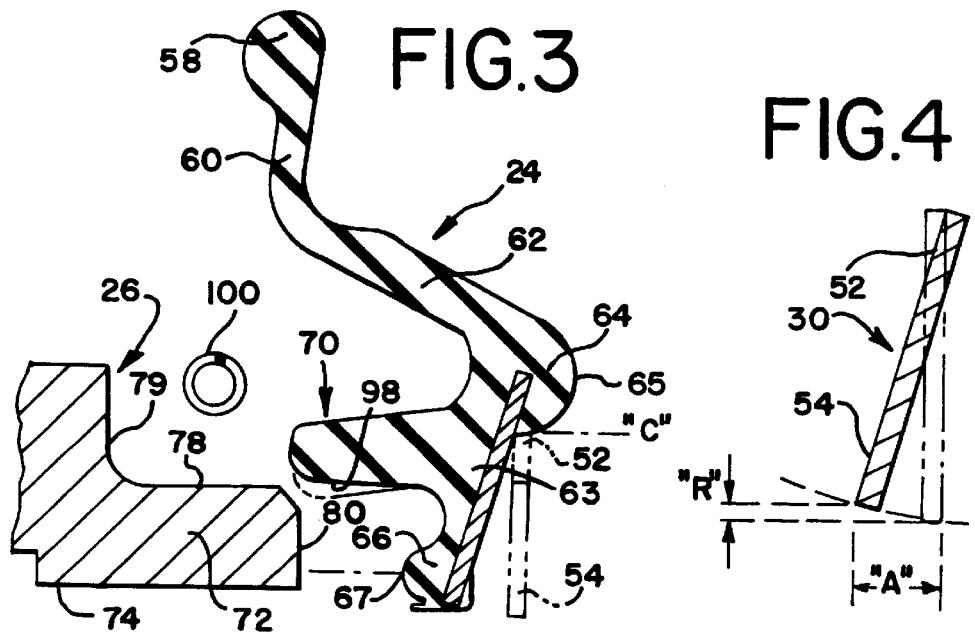
FIG. 3 is an enlarged fragmentary, vertical sectional view of a portion of the multi-function composite unit of the invention showing its as-formed condition and also illustrating the position it assumes in use in relation to the other elements of the invention.
Figure 4:
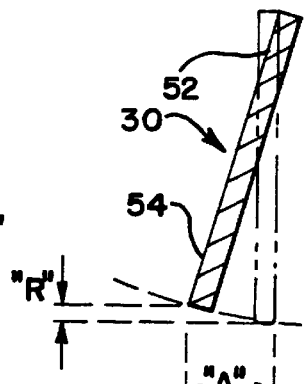
FIG. 4 is a sectional view, partly diagrammatic in nature, and showing a design aspect of the invention that is addressed by forming the multi-function composite unit as described herein; and, FIG. 5 is a fragmentary sectional view of a modified form of seal made according to the invention.

Still further, this installation action has flattened the finger spring 30, rendering it virtually planar, so as to develop the necessary load. As shown in FIGS. 3 and 4, the flattening action of the spring occurs, in view of its geometry, about a virtual point "C" which is the spring center for this purpose. This moves the spring inner end through distance "A" in FIG. 4. Because of the shape of the load bearing formation 66 and the rounded nature of its outer surface 67, the small radial displacement ("R" in FIG. 4) of the radially innermost portion of the spring finger 54 accompanying movement "A" causes only a slight deformation of this formation 66 and a rolling action between its contoured outer surface 67 and that of the end face 80, when the spring is oscillating around its flat position during use of the seal.

During installation, there will normally be considerable sliding between surfaces 67 and 80 and between surfaces 65 and 88, because the spring undergoes radial movement as it flattens. In use, when the spring is almost flat, as shown in FIG. 4, this radial movement "R" is accommodated by bead deformation rather than sliding friction, and this provides an advantage to the present seal construction.

A similar action, takes place as the contact surface 65 of the bead or load bearing formation 64 moves radially during contact with the end wall 88. This also reduces any possible scraping action which can lead to premature wear or other damage to the assembly 20.

Another consequence of flattening the finger spring 30 is that the collar 70, which is bonded to the body 52 of the finger spring 30, is pulled radially inwardly for increased radial load on the seal ring surface 78. Thus, as greater force is applied to the end face of the seal (as occurs when the spring is flattened), an increase in residual interference force occurs between the collar 70 and the ring 26, insuring that there will be adequate torque transmitting force at the interface between the surfaces 78 and 98.

As shown in FIG. 3, a garter spring 100 may be used to provide a supplemental radial load if this is believed necessary. Such a spring can be used in the embodiment of FIG. 5, also.

As a result of the foregoing considerations, when there is dynamic runout occurring through an operating cycle of the seal, the movement of the finger spring will not damage the seal ring, but will be accommodated by the resiliency of the rubber shape or load bearing formations 64, 66.

In some prior art designs, particularly those where a right angle seat is provided for a finger spring, the change in spring radial dimension as it flattens axially has caused an unduly great increase in the radial load, restricting free movement and compromising the intended object of minimal change in end face sealing force with axial deflection of the parts. In this invention, these changes in radial dimension are taken up by elastic deformation of the collars 70 and 62, whereas the finger spring is free to move radially.

Accordingly, the present invention takes advantage of using rounded, flattenable contact surfaces between the housing or a seal retainer and the seal ring adapted to deform under the loads normally encountered without changing the spring rate or other characteristic of the finger spring. The combination of this action with the responsive movement of the seal retaining collar is another important advantage of the invention.

A still further advantage of the invention lies in the shape of the outer collar and the outer seal components. Here, where positive pressure is seen in the liquid region 92, the rubber parts exposed to this pressure are backed up, largely or completely, by portions of the seal retainer. Hence, by having this collar 62 follow rather than span the adjacent surfaces of the counterbore, there is an absence of deformation created by internal pressure in the region 92. This pressure likewise is seen to have an augmenting effect on the seal between the inner collar 70 and the surface 78 of the seal ring, which is also desirable.

Referring now to FIG. 5, another variation of the seal is shown. Here, the seal ring generally designated 28a has a body portion 72a that includes the end face 80a of its counterpart in FIG. 3, but the surface 78a which faces the contact surface 98a of the rubber inner collar 70a is an inclined or frustro-conical surface rather than a cylindrical surface as in its counterpart 78a. This may be desirable in some applications wherein the friction between the collar and the sealing ring may unduly reduce the axial load when the spring force is opposed by internal pressure.

The drawings have illustrated the use of a finger type spring as the preferred component for applying an axial load to the sealing ring.

Other kinds of springs are suitable for this application. For example, a dished or contoured spring such as the dished or Belleville washer type spring without fingers will display proper load/deflection curve throughout a portion of its working range and is also suitable for this application. Springs of this overall configuration, including those which have cutouts, notches, or perforations in their radial sections are also suitable. Other particular configurations may also occur to those skilled in the art.

The principal criterion is that the spring, when operating within its working range, should provide minimal variation in load through a significant range of deflection. Thus, a Belleville or finger spring type washer initially manifests a significant increase in load with deflection, but as the spring flattens out or becomes more planar, the load/deflection curve flattens out significantly. This is the desired behavior discussed above, i.e., the maintenance of a predetermined force without excess variation during the axial excursions encountered during wear and use.

The design of the preferred form of seal described herein is such that a positive pressure in the sealed region will increase the radial compressive load on the collar 70 and hence the torque transmission capability of this component relative to the seal ring surface 78. In some instances, depending on the configuration of the elastomer component and the springs, an increased internal pressure may also tend to flatten the spring enough to reduce the axial load on the seal ring 26, i.e., the spring force pushing the ring to the left as seen in FIGS. 2 and 3. With the spring configuration of FIG. 5, which is shown merely by way of illustration and not with respect to its actual dimensions or proportions, the inclined surface 78a may be configured such that an increased radial load 70a will bias the seal ring 26a to the left as shown in FIG. 5. In other words, the radial force is resolved into both radial and axial components, the axial component extending towards the left in FIG. 5 and hence towards a tighter seal. This pressure balance arrangement may be desired in some circumstances.

Internal pressure in the sealed region will also be "seen" by the shoulder surface 79 as tending to increase the axial force exerted on the seal ring 26. Such pressure may tend to separate the flange 63 carrying the spring from the ring 26 by exerting oppositely directed pressure on both. Hence, the end wall 88 of the counterbore 90 can be dimensioned so as to prevent the inner end of the spring 52 from moving so far to the right as to separate the ring from the collar 70. This is an optional "fail safe" feature. Other forces and their resolution may depend upon the respective diameters and location of exposed portions of the shoulder surfaces 79 and 80 relative to the end face 76 and seal band 29 of the sealing ring 26. Such alteration or variations of the dimensions and design features may be accomplished by those skilled in the art without departing from the inventive concept.

In the illustrated embodiments, the seal ring has been stationary and the shaft and the impeller rotate relative to the housing. In addition, the radially inner portions of the annular disc or finger-type spring apply the load to the seal ring and the outer portions apply forces to the housing. Under some circumstances, it may be desirable to reverse these relations whereby the seal ring and the elastomeric component would rotate with the shaft and the other components remain stationary. Likewise, the inner diameter of the spring could act on the housing with the outer diameter portion acting on the seal ring if this were desired for some reason.

It will thus be seen that the present invention provides a new and improved form of liquid end face seal having a number of advantages and characteristics including those pointed out herein and others which are inherent in the invention. Representative examples of the invention, having been described in detail by way of example, it is anticipated that various modifications and changes to the forms of invention described herein will occur to those skilled in the art and it is anticipated that such changes and variations may be made without departing from the spirit of the invention and the scope of the appended claims.

I claim:

1. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said unitary elastomeric body further including a flange extending radially outwardly from said mounting portion receivable in said counterbore, said flange terminating in a circumferentially continuous annular sealing bead.

2. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said flexible finger spring unit operating throughout a working range lying to either side of and passing through a generally flat position.

3. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said first annular load bearing formation including an axially outwardly facing arcuate surface.

4. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said second, inner load bearing formation including an axially inwardly facing arcuate surface.

5. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said secondary sealing surface on said sealing ring positioning collar being of frustoconical configuration, and wherein said seal ring seating surface is also of a frustoconical configuration.

6. A liquid seal unit comprising, in combination, an annular seal ring including an annular seal ring seating surface, a seal mating ring sized and positioned to form a liquid-tight dynamic seal with said seal ring, and a composite member serving to provide an end load on said seal ring and to provide a liquid-tight secondary seal, said composite member comprising a unitary elastomeric body portion and a flexible finger spring unit having an annular continuous outer body portion and a plurality of circumferentially spaced apart, radially inwardly extending flexible spring fingers, said finger spring unit being at least partially embedded in said elastomeric body, said unitary elastomeric body including a mounting portion receivable in a machine counterbore, a web portion extending radially inwardly from said mounting collar portion, a first annular load bearing formation extending axially outwardly from the region of said elastomeric body surrounding said annular finger spring outer body portion, a second inner annular load bearing formation extending axially inwardly of said inner end portions of finger spring unit, and an axially inwardly extending seal ring positioning collar formed as a part of said elastomeric body and lying radially between said load bearing formations, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface, said seal further including a garter spring surrounding a radially outwardly directed surface portion of said seal ring positioning collar, said garter spring supplementing the radial load provided by said seal ring positioning collar on said seal ring.

7. An end face seal assembly comprising, in combination, an elastomeric element having a body portion with an outer radial flange terminating in a circumferentially continuous annular sealing bead, an axially outwardly extending, radially outer collar portion adapted to have its radially outer surface received in seating relation within a counterbore in an associated machine element, a continuous inner radial flange portion extending generally radially inwardly from an axially outer portion of said radially outer collar, said elastomeric element also having axially oppositely directed, radially spaced apart load bearing formations of generally annular form and an axially inwardly extending, radially inner seal ring positioning collar integrally formed from a portion of said body portion lying radially between said load bearing formations, a spring of annular form having a continuous outer margin and plural spaced apart radially inwardly extending fingers, said spring being at least partially embedded in said continuous inner radial flange portion of said elastomeric body and having its radially outermost edge portion generally disposed in axial alignment with said outer load bearing formation and with the radially innermost portions of said fingers being disposed generally in axial alignment with said radially inner load bearing formation, a seal ring of generally cylindrical form having an axially inner end face portion adapted for sealing engagement with a seal mating ring, an at least partially axially extending seating surface and an axially outer radial end face surface, said seating and end face surfaces in use being engaged respectively by an inner circumferential surface of said seal ring positioning collar and a portion of said inner load bearing formation, and wherein both said inner circumferential surface of said seal ring positioning collar and said at least partially axially extending seating surface on said seal ring are of frustoconical configuration.

8. An end face seal assembly comprising, in combination, an elastomeric element having a body portion with an outer radial flange terminating in a circumferentially continuous annular sealing bead, an axially outwardly extending, radially outer collar portion adapted to have its radially outer surface received in seating relation within a counterbore in an associated machine element, a continuous inner radial flange portion extending generally radially inwardly from an axially outer portion of said radially outer collar, said elastomeric element also having axially oppositely directed, radially spaced apart load bearing formations of generally annular form and an axially inwardly extending, radially inner seal ring positioning collar integrally formed from a portion of said body portion lying radially between said load bearing formations, a spring of annular form having a continuous outer margin and plural spaced apart radially inwardly extending fingers, said spring being at least partially embedded in said continuous inner radial flange portion of said elastomeric body and having its radially outermost edge portion generally disposed in axial alignment with said outer load bearing formation and with the radially innermost portions of said fingers being disposed generally in axial alignment with said radially inner load bearing formation, a seal ring of generally cylindrical form having an axially inner end face portion adapted for sealing engagement with a seal mating ring, an at least partially axially extending seating surface and an axially outer radial end face surface, said seating and end face surfaces in use being engaged respectively by an inner circumferential surface of said seal ring positioning collar and a portion of said inner load bearing formation, said seal assembly further including a radially inwardly acting garter spring positioned in radially overlying relation to said seal ring positioning collar so as to increase the radial load exerted by said collar on said seal ring seating surface.

9. A liquid seal unit comprising, in combination, an annular seal ring having a seating surface, a combination end load applying and seal ring positioning element, said combination element comprising a unitary elastomeric body including radially inner and outer annular load bearing formations extending in axially opposite directions, an axially inwardly extending seal ring positioning collar formed as part of said elastomeric body and lying radially between said load bearing formations, a flexible finger spring unit at least partially embedded in said elastomeric body and having a continuous radially outer body portion and a plurality of circumferentially spaced apart flexible fingers extending radially inwardly therefrom, said collar having a generally radially inwardly facing secondary sealing surface receivable in facing relation to said seal ring seating surface, said collar responding to an axially outward deflection of said fingers on said finger spring unit by deflecting radially inwardly and increasing the radial load exerted on said seal ring seating surface.

\* \* \* \* \*